United States Patent
Peeters

(10) Patent No.: US 7,322,568 B2
(45) Date of Patent: Jan. 29, 2008

(54) DAMPING SPRING FOR USE IN AGRICULTURAL IMPLEMENTS

(75) Inventor: Kenneth J. Peeters, Bear Creek, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 327 days.

(21) Appl. No.: 11/061,417

(22) Filed: Feb. 18, 2005

(65) Prior Publication Data

US 2006/0048493 A1    Mar. 9, 2006

Related U.S. Application Data

(60) Provisional application No. 60/607,813, filed on Sep. 8, 2004.

(51) Int. Cl.
*F16F 1/00* (2006.01)
*F16F 9/00* (2006.01)

(52) U.S. Cl. .......................................... 267/72; 267/70

(58) Field of Classification Search ......... 280/124.147, 280/781, 787, 788; 267/251, 220, 140, 140.13, 267/221, 70–72, 135, 169, 202, 291; 56/375; D15/28

See application file for complete search history.

(56) References Cited

U.S. PATENT DOCUMENTS

| | | | | |
|---|---|---|---|---|
| 1,211,558 A * | 1/1917 | Drummond | .................. | 404/128 |
| 2,350,848 A * | 6/1944 | Wagner | ...................... | 267/222 |
| 2,402,571 A * | 6/1946 | Olander | ....................... | 267/214 |
| 2,705,633 A * | 4/1955 | Potter, Jr. et al. | ........... | 267/211 |
| 3,052,435 A * | 9/1962 | Roller | ......................... | 248/569 |
| 4,053,171 A | 10/1977 | Hyler | | |
| 4,079,925 A * | 3/1978 | Salin | .......................... | 267/129 |
| 4,564,075 A | 1/1986 | Chekouras | | |
| 4,681,303 A * | 7/1987 | Grassano | ..................... | 267/113 |
| 5,185,976 A * | 2/1993 | Miyake et al. | ............. | 52/167.6 |
| 5,233,818 A * | 8/1993 | Dettbarn | ..................... | 56/12.6 |
| 5,236,169 A * | 8/1993 | Johnsen | ....................... | 248/561 |
| 5,611,325 A * | 3/1997 | Kudlacek | ...................... | 124/89 |
| 6,220,008 B1 | 4/2001 | Rowse et al. | | |
| 6,330,785 B1 | 12/2001 | Rowse et al. | | |

OTHER PUBLICATIONS

"Equipment to Rake and Merge Hay and Forage," By K.J. Shinners and R.T. Schuler, http://www.uwex.edu/ces/forage/wfc/proceedings2003/equipment.htm, Sep. 30, 2004 (6 pgs).

* cited by examiner

*Primary Examiner*—Árpád Fábián Kovács
(74) *Attorney, Agent, or Firm*—Patterson, Thuente, Skaar & Christensen, P.A.

(57) ABSTRACT

A damping spring assembly particularly but not exclusively useful for damping the motion of rake wheels in agricultural wheel rakes. The damping spring includes a pair of extended U-bolts and a coil compression spring. The extended U-bolts are connected to spring holder bushings which bear on the ends of the coil compression spring. As the coil compression spring is compressed, a constrained resilient damping rod located within the extended shafts of the extended U-bolts is likewise compressed in length and expands in diameter to bear against the extended shafts of the extended U-bolts, thus providing a damping action to prevent snapping back of the damping spring.

39 Claims, 5 Drawing Sheets

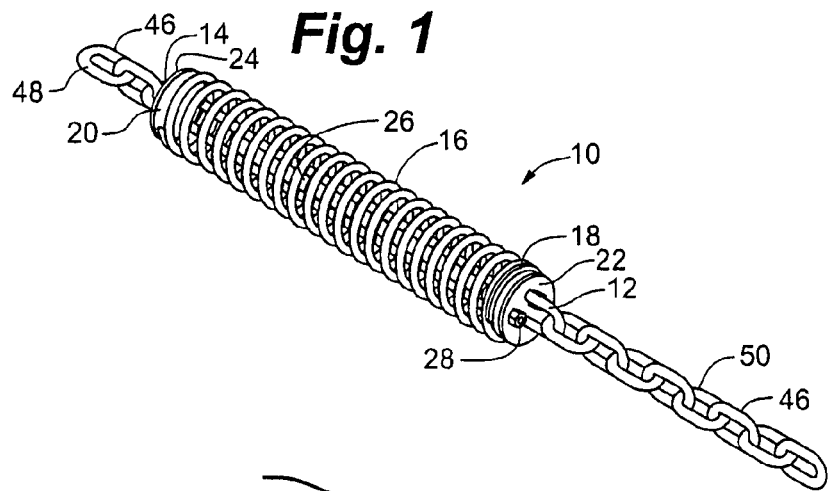
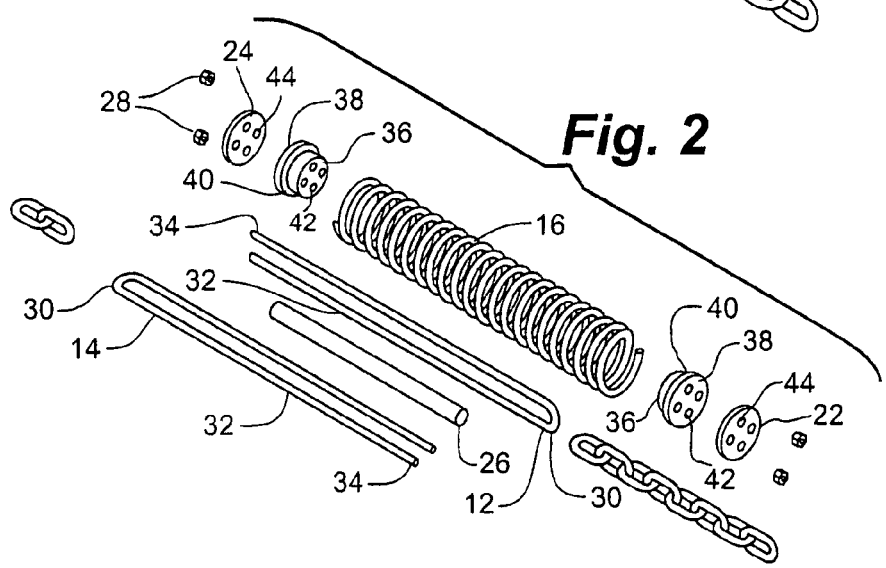
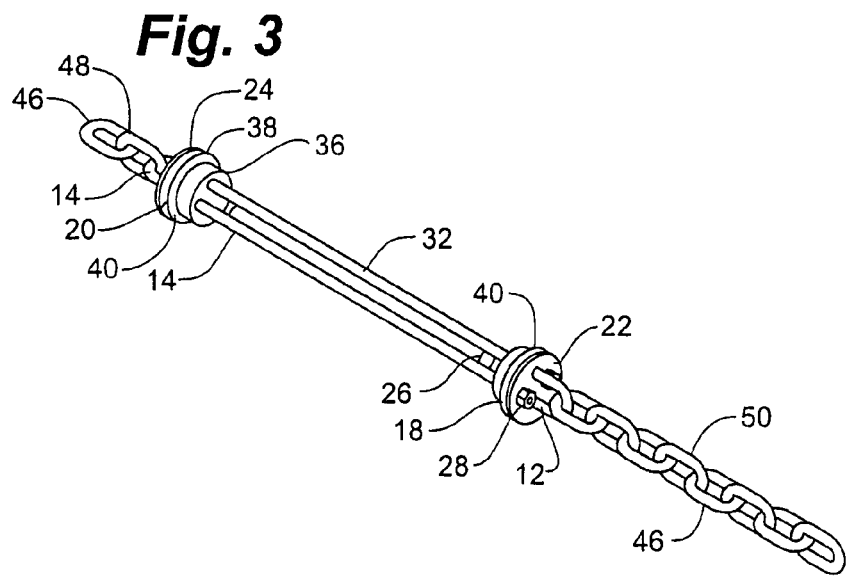

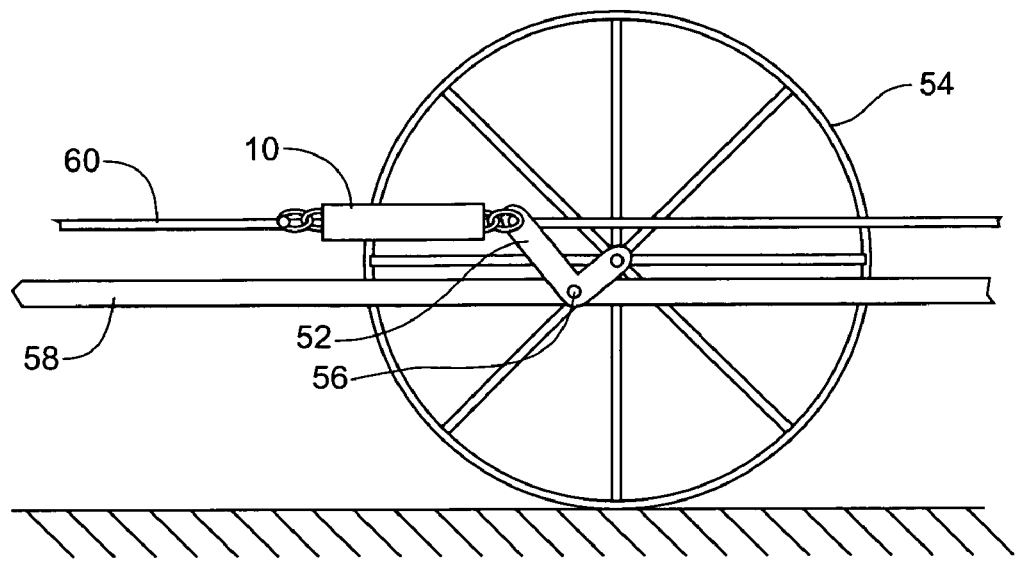
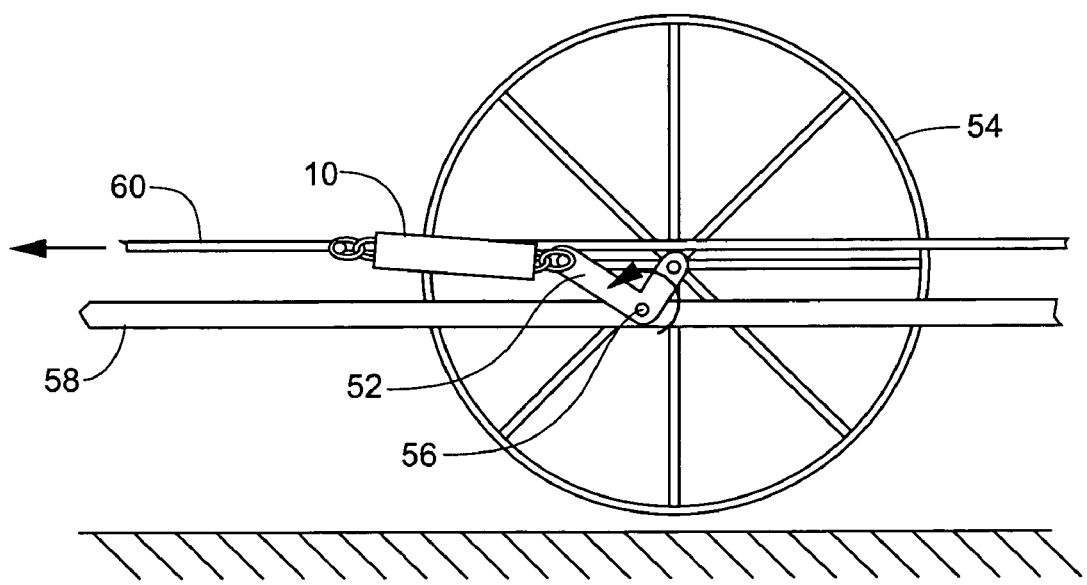

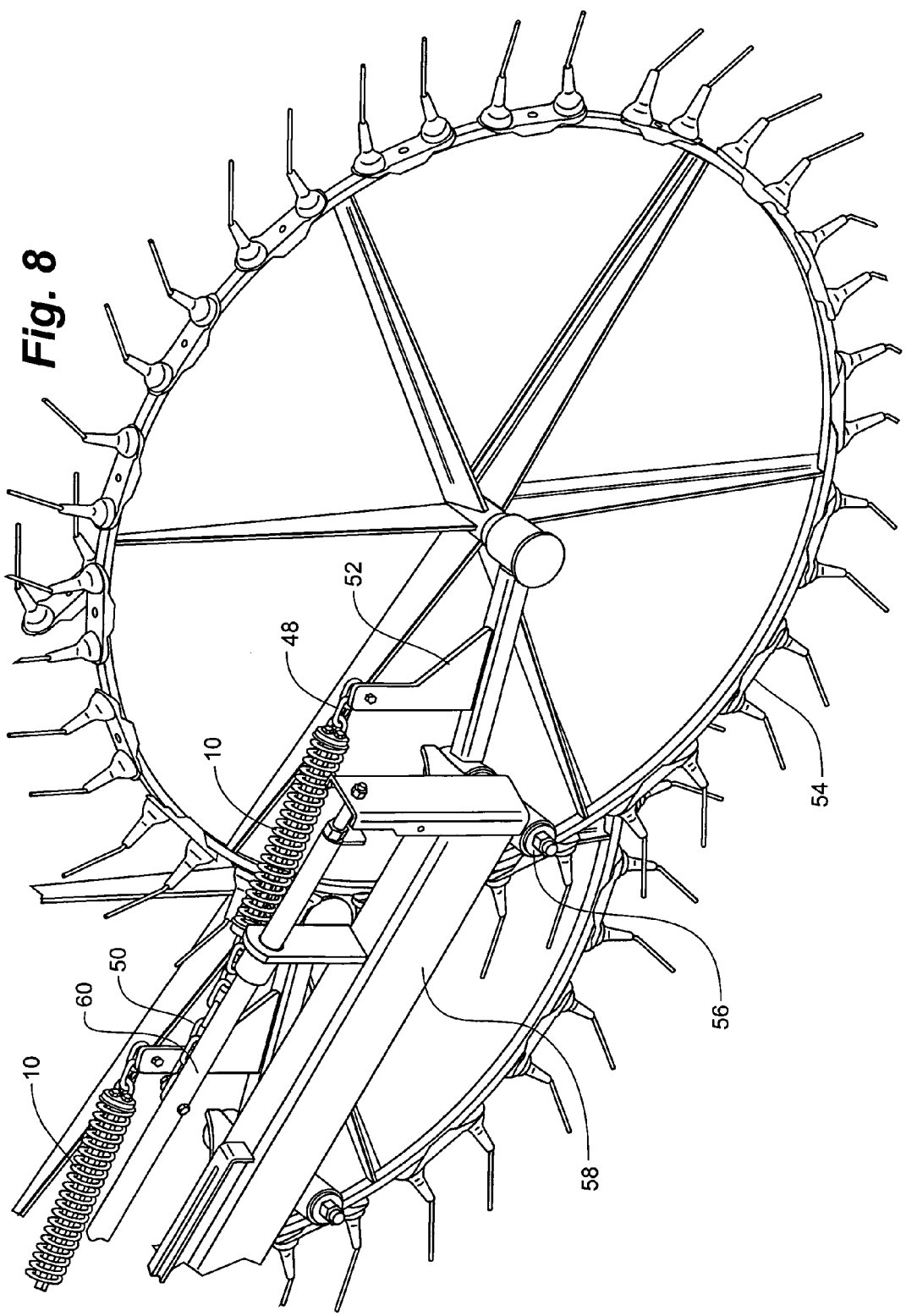

DAMPING SPRING FOR USE IN AGRICULTURAL IMPLEMENTS

RELATED APPLICATION

The present application claims the benefit of U.S. Provisional Application No. 60/607,813 filed Sep. 8, 2004, which is incorporated herein in its entirety by reference.

FIELD OF THE INVENTION

The invention relates to agricultural implements and more particularly to springs for damping of the motion of rake wheels used in wheel rakes that are useful to form windrows from cut forage.

BACKGROUND OF THE INVENTION

A primary goal in the harvesting of hay or forage is to dry the hay as soon as possible and then to remove it from direct exposure to sunlight. The hay must be dried before storage to avoid the problems of mold and spontaneous combustion. Exposing the cut hay to sunlight longer than is required to adequately dry it, however, can result in unacceptable loss of nutritive value of the hay due to deterioration of the protein level.

Typically, hay is harvested into approximately five-foot swaths along the ground, and is exposed to sunlight for the initial stage of the drying process. These swaths spread out the hay to maximize exposure to the sun and air to speed initial drying. The swaths of hay are then raked into narrow windrows to remove most of the hay from direct contact with the moist ground. The windrow enhances air circulation within the hay, thereby hastening the drying process. Raking hay into windrows also facilitates gathering of hay by providing rows of forage for a hay baler or other harvesting device to follow.

Many types of wheel rakes have existed for decades. Wheel rakes utilize angled, tined "pinwheels" that are propelled across the ground of a field of cut forage. Contact with the ground while traveling across the ground rotates the wheels and thereby rakes the hay in a desired direction. Of particular interest are V-rakes in which at least two banks of rake wheels are deployed in the shape of a V during operation. Generally, V-rakes employ an arm on each side of a frame to support the wheel rakes. Such V-rakes are used to rake forage into a windrow by raking the forage from the outer edges of the implement inward. V-rakes are preferably adjustable so that the width of the windrow produced is variable and the swath raked on each pass is optimal for the circumstances encountered. For optimal operation, it is preferable that the relative angle of the wheel banks and the width of their separation be independently adjustable.

Wheel rakes are subject to repeated structural stresses due to uneven ground and irregular distribution of forage material when propelled through fields of cut hay to form the hay into windrows. The assemblies supporting the rake wheels must have considerable strength in order to bear such stresses successfully. Welded assemblies are thus preferred for their robustness and durability. In addition, a certain degree of flexibility in motion of the rake wheels is desirable. Some flexibility of the assembly is desired as well.

Wheel rakes convert the forward motion of the rake into a lifting and sideward motion by interaction of the rake wheels with the ground as the wheel rake is drawn forward. Compacted, damp or unusually heavy forage can create problems in that the rake wheels may tend to roll over or skip over areas of heavy compacted forage rather than lifting it and raking it toward the desired windrow. If this occurs, loss of production and increased costs result. Loss of production occurs if forage is left in the fields to decay rather than being harvested. Increased costs can occur if it is necessary to pass through the fields several times to accomplish sufficient raking to gather all of the forage desired.

Rake wheels include a plurality of tines extending from the rim of the wheel. Flexible metal tines lift and move forage to one side as the rake wheels rotate.

Thus, wheel rakes generally have adjustable tension springs that allow the wheels to float. The spring tension can be adjusted to cause more or less of the wheel's weight to bear on the ground. If wheel float is too light, wheels will pass over the crop and leave some of the crop unraked. If wheel float is too heavy, wear on the rake wheels is increased and the rake wheel will dislodge more soil and rocks from the earth and increase contamination of the hay.

Traditionally, and sometimes today, tines extend the entire distance from the rake wheel hub beyond the rim. More commonly tines are attached to the wheel rim and the rim to the hub via spokes or a wheel disk. In the event that spokes are utilized, a plastic disc often covers the spokes. This arrangement keeps forage from passing through the wheel instead of being raked as desired.

Modern rake wheels often utilize metal tines mounted in flexible rubber bases. The rubber bases secure the tines to the wheel rim and provide a measure of controlled flexibility so that each tine can flex in response to loads in all directions without bending or breaking.

Wheel rakes are typically constructed so that multiple rake wheels are mounted side by side mounted on long beams. It is desirable that the beams be adjustable in width or separation and in the angle that the beams make with the path of travel as viewed from above.

Rake wheels are flexibly supported as they pass over the ground so that the full weight of the rake wheel does not rest on the ground. Rake wheel are typically biased upward by springs so that the rake wheels may resiliently flex upwardly as the wheel rake passes over a bump and so that the rake wheels can move downward when the wheel rake passes over a depression in the ground.

Commonly, tension springs are used in cooperation with a bellcrank to resiliently support the rake wheels. The tension springs are generally oriented horizontally while the motion of the rake wheel is along a generally vertical arc. The tension springs are often linked directly to the to the bellcrank or via short chains connected to eyes at the end of the springs. Several problems arise with this arrangement. With repeated stress the spring eyes may suffer metal fatigue and break. This not only interferes with proper raking action but also may cause damage to the rake wheel and cause loss of the spring in the field where it may later cause damage to other farm implements or equipment. For example, a lost spring may interfere with a hay mower during the next mowing of the field and damage the hay mower.

Tension springs may also be damaged by being overextended. If the tension spring is stretched too far it may no longer recoil as it once did. This will cause the rake wheel to bear on the ground to a greater degree than it should and may cause excess wear and or damage.

Further, the tension spring supporting the rake wheel may "snap back" when the spring is loaded and then the load on the tension spring is abruptly released. This can also damage the rake wheel assembly.

Thus the agricultural arts would benefit from a device to provide spring tension for supporting rake wheels and the like that is less prone to breakage and that does not "snap back" when released. It would be beneficial if the device were resistant to overextension as well.

SUMMARY OF THE INVENTION

The present invention is a damping spring that solves many of the above problems. In one embodiment, the damping spring of the present invention generally includes a pair of opposed extended U-bolts, a coil compression spring, a pair of spring holder bushings, a pair of spring holder washers, a resilient damping rod, and nuts to secure the extended U-bolts.

The coil spring is capped on each end by the pair of spring holders. Each spring holder has four holes bored therethrough. The extended U-bolts pass through an opposed pair of holes in a first spring holder, then through the interior space surrounded by the coils of the coil spring and through another pair of opposed holes in the second spring holder. A spring holder washer is placed over the threaded ends of the extended U-bolt and two nuts are threaded on to the ends of the extended U-bolt to secure the extended U-bolt to the second spring holder. A second extended U-bolt is passed from the opposite end of the damping spring through the spring holder washer, the second spring holder, the interior of the coil spring, through a pair of opposed holes in the first spring holder, and through a spring holder washer, where the threaded ends of the second U-bolt are secured with nuts. Once the extended U-bolts are placed in this orientation, they form a cage surrounding a space formed by the four shafts of the extended U-bolts. In this space is placed the resilient damping rod.

Thus, the assembled damping spring in this embodiment, as viewed in cross-section at the center of the spring, includes the coils of the coil spring on the outside, a space, the four shafts of the two extended U-bolts forming a substantially square cage formed of four straight shafts, and within that cage a resilient damping rod.

In another embodiment, the assembled damping spring includes one U-bolt and an eyebolt positioned between the legs of the U-bolt and an annular damping member surrounding the shaft of the eyebolt. In yet another embodiment two eyebolts are utilized with a resilient damping member located between their shafts.

Thus, when tension is applied to the first and second U-bolts, the U-bolts transfer the load to the nuts at the ends thereof. The nuts contact the spring holder washer which transfers the load to the pair of spring holders which bear against the ends of the compression coil spring. Thus, tension applied to the U-shaped ends of the first and second extended U-bolts causes the coil compression spring to be compressed. The length of the resilient damping rod may be less than the length of the coil compression spring. Thus, the spring may be compressed a limited amount before the spring holders come into contact with the ends of the resilient damping rod. Alternately, the damping rod may be partially compressed when the spring is at its maximum extended length if preloading of the resilient damping rod is desired. When the spring holders come into contact with the resilient damping rod, the resilient damping rod is shortened in length but thickens in diameter. As the resilient damping rod thickens in diameter it begins to rub against the shafts of the first and second extended U-bolts from the inside. As the resilient damping rod is further compressed end to end it will expand further flexing and bowing outward the shafts of the first and second extended U-bolts.

As tension on the U-shaped ends of the two extended U-bolts is relieved, the coil compression spring tends to return to its extended length. As this occurs, the two extended U-bolts move in opposite directions while rubbing against the sides of the resilient damping rod. Thus, the resilient damping rod will slow the motion of the two extended U-bolts as they pass by each other and damp the action of the coil compression spring as it returns to its extended length. In addition, as the extended U-bolts may be forced into a bowed or flexed position by expansion of the resilient damping rod, friction occurs between the two extended U-bolts and the spring holders where the U-bolts pass through the opposed holes in the spring holders. This also contributes to the damping action of the resilient damping rod.

The degree of damping can be adjusted by adjusting the length of the resilient damping rod. A longer resilient damping rod will expand more readily as the coil compression spring is compressed, thus increasing damping. A shorter resilient damping rod will reduce damping because the resilient damping rod will not be compressed until the compression coil spring is further compressed by the motion of the two extended U-bolts.

In addition, the compression coil spring only compresses until its coils come into contact with one another thus limiting the extend to which the spring can be compressed. Thus the spring is resistant to being over extended.

BRIEF DESCRIPTION OF THE DRAWINGS

FIG. 1 is a perspective view of a damping spring in accordance with the present invention;

FIG. 2 is an exploded perspective view of the damping spring of the present invention;

FIG. 3 is a perspective view of the damping of the present invention with the coil compression spring removed to show the interior parts with greater clarity; and FIG. 4 is a fragmentary view of a wheel rake including a damping spring with a rake wheel depicted in schematic, and in contact with the ground;

FIG. 5 is a fragmentary view of a wheel rake including a damping spring with a rake wheel depicted in schematic, and raised from contact with the ground;

FIG. 8 is a partial perspective view of the wheel rake of FIG. 7. including damping springs in accordance with the present invention.

DETAILED DESCRIPTION OF THE INVENTION

Figure 6A:
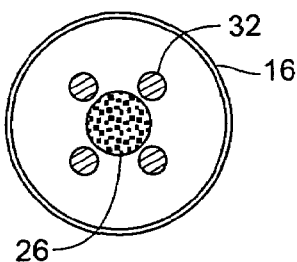
FIG. 6a is a cross-sectional view of the damping spring including a resilient damping member of circular cross section.
Figure 6B:
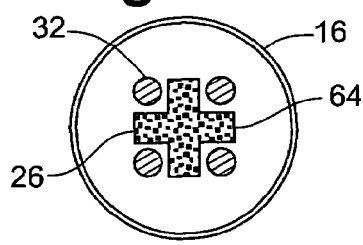
FIG. 6b is a cross-sectional view of the damping spring including a resilient damping member of cruciform cross section.
Figure 6C:
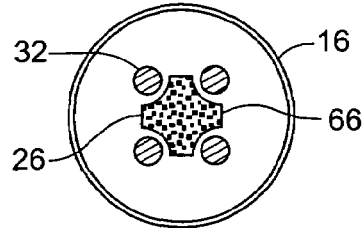
FIG. 6c is a cross-sectional view of the damping spring including a resilient damping member of modified cruciform cross section.
Figure 6D:
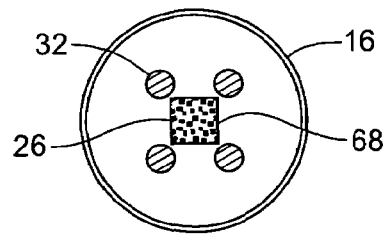
FIG. 6d is a cross-sectional view of the damping spring including a resilient damping member of square cross section.
Figure 6E:
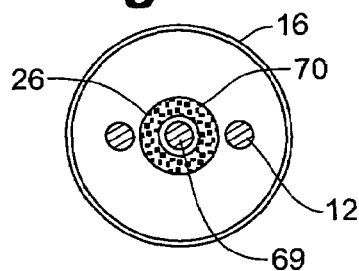
FIG. 6e is a cross-sectional view of the damping spring including a U-bolt, and eyebolt and a resilient damping member of annular cross section.
Figure 6F:
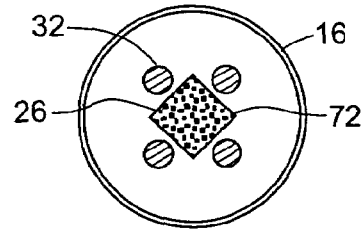
FIG. 6f is a cross-sectional view of the damping spring including another resilient damping member having a diamond cross section.
Figure 6G:
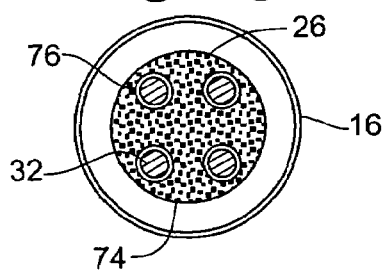
FIG. 6g is a cross-sectional view of the damping spring including a resilient damping member of circular cross section including channels therethrough to accommodate U-bolt shafts.

Referring to FIGS. 1-3, damping spring 10 of the present invention generally includes first extended U-bolt 12, second extended U-bolt 14, coil compression spring 16, first spring holder bushing 18, second spring holder bushing 20, first spring holder washer 22, second spring holder washer 24, resilient damping member 26, and nuts 28. First extended U-bolt 12 and second extended U-bolt 14 are substantially similar and include U-shaped ends 30, extended shafts 32 and threaded ends 34. First extended U-bolt 12 and second extended U-bolt 14 may be formed from stainless steel or other high strength, corrosion resistant material.

Coil compression spring 16 is a generally conventional compression spring of a size appropriate to contain first extended U-bolt 12 and second extended U-bolt 14 within its inner diameter.

First spring holder bushing 18 and second spring holder bushing 20 are substantially similar in construction. First spring holder bushing 18 and second spring holder bushing 20 both include a small diameter portion 36 and a large diameter portion 38. Small diameter portion 36 and large diameter portion 38 are concentrically positioned to form shoulder 40. First and second spring holder bushings 18, 20 are desirably formed of unitary piece of material. For example, ultra high molecular weight polyethylene may be used to form first and second spring holder bushings, 18, 20. First and second spring holder bushings 18, 20 are pierced by four substantially evenly spaced holes 42. Holes 42 are desirably arranged in a four cornered or square pattern.

Small diameter portion 36 is sized to fit within the inside diameter of coil compression spring 16. Large diameter portion 38 is sized to substantially equal the outside diameter of coil compression spring 16.

First spring holder washer 22 and second spring holder washer 24 are substantially similar in construction. First and second spring holder washers 22, 24 are substantially equal in diameter to large diameter portion 38 of first and second spring holder bushings 18, 20. First and second spring holder washer 22, 24 are pierced by four holes 44. Holes 44 are located to align precisely with holes 42 located in first and second spring holder bushings 18, 20.

Resilient damping member 26 may be shaped as an elongate cylinder and is formed of a resilient material that desirably has a significant surface friction. Resilient damping member 26, as depicted in examples in FIG. 6, may also be shaped in a polygonal cross section or in a cross section that partially or completely surrounds some or all of extended shafts 32. Resilient damping member 26 may be formed of rubber or another resilient material. One material that may be used to form resilient damping member 26 is rubber O-ring material. Resilient damping member 26 is dimensioned so that it has a diameter or cross sectional dimension slightly smaller than the space between extended shafts 32 of first extended U-bolt 12 or second extended U-bolt 14. The length of resilient damping member 26 may be more or less than the length separating first spring holder bushing 18 and second spring holder bushing 20 when coil compression spring 16 is uncompressed. The length of resilient damping member 26 relative to coil compression spring 16 may be varied to adjust the damping qualities of resilient damping member 26. In addition, the diameter of resilient damping member 26 may be varied to increase or reduce the frictional interaction of resilient damping member 26 with extended shafts 32.

Nuts 28 are generally conventional but may be self locking nuts.

Damping spring 10 may be connected to other assemblies by chains 46. For use with a wheel rake, short chain 48 and long chain 50 may be utilized to interconnect damping spring 10 with the wheel rake assembly.

Referring to FIG. 4, damping spring 10 is connected to bell crank 52 by short chain 48. In turn, bell crank 52 supports rake wheel 54. Bell crank 52 is movably supported at pivot 56, which is in turn supported by rake beam 58. Preferably, damping spring 10 is located substantially horizontally, but damping spring 10 may be located in any position as decided by those skilled in the art. Long chain 50 is desirably connected to rake wheel lift tube 60. Rake beam 58 may be attached to any wheel rake known to the agricultural arts. For example, rake beam 58 may be utilized in a V-rake.

Referring to FIG. 6, resilient damping member 26 can be formed with many different cross-sections. For example, FIG. 6a depicts an embodiment of the invention including a resilient damping member 26 of round cross-section 62. FIG. 6b depicts a resilient damping member 26 having a cruciform cross-section 64. FIG. 6c depicts a resilient damping member 26 having a modified cruciform cross-section 66. FIG. 6d depicts a resilient damping member 26 having a quadrilateral or square cross-section 68. FIG. 6e depicts a resilient damping member 26 including one U-bolt 12 and one eyebolt 69 and a resilient damping member 26 having an annular cross-section. FIG. 6f depicts a resilient damping member 26 having a diamond cross-section 72. FIG. 6g depicts a cross-sectional view of including a resilient damping member 26 having a circular cross-section 76 with channels therethrough. In this embodiment of the invention, first extended U-bolt 12 and second extended U-bolt 14 pass through channels 76 in resilient damping member 26.

Figure 6H:
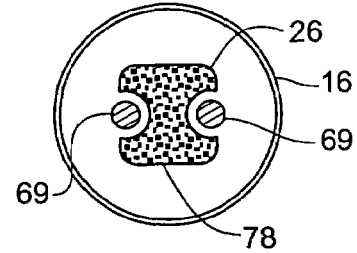
FIG. 6h is a cross-sectional view of the damping spring including two eyebolts and a resilient damping member of H-shaped cross section.

Referring to FIG. 6h, an embodiment of the invention utilizing two eyebolts 69 and a resilient damping member 26 having an H-shaped cross section 78 located therebetween. In this embodiment, two eyebolts are utilized with their extended shafts 32 parallel and a resilient damping member 26 with H-shaped cross section 78 located between them.

Damping spring 10 is described here as utilized to support rake wheels 54 in an agricultural wheel rake. Indeed, damping spring 10 is particularly useful in this circumstance. However, the use of damping spring 10 in wheel rakes should not be considered to be limiting as damping spring 10 may be utilized for other purposes within the agricultural arts.

Damping spring 10 is assembled, so that first extended U-bolt 12 is passed through first spring holder washer 22, then through spring holder bushing 18. First extended U-bolt 12 then is further extended into the interior of coil compression spring 16. Threaded ends 34 of first extended U-bolt 12 then pass through second spring holder bushing 20 and second spring holder washer 24. The threaded ends 34 then receive nuts 28 which are tightened to prevent threaded ends 34 from pulling through holes 44 in second spring holder washer 24.

Second extended U-bolt 14 passes through second spring holder washer 24, then through second spring holder bushing 20 through the interior of coil compression spring 16, then through first spring holder bushing 18 and first spring holder washer 22. The exposed threaded ends of second extended U-bolt 14 are then secured with nuts 28. Prior to completely assembling damping spring 10, resilient damping member 26 is placed within the space formed by extended shafts 32 of first extended U-bolt 12 and second extended U-bolt 14. Chains 46 may be secured to U-shaped ends 30 of first extended U-bolt 12 and second extended U-bolt 14 by passing a link of chain 46 over one of extended shafts 32.

Figure 7:
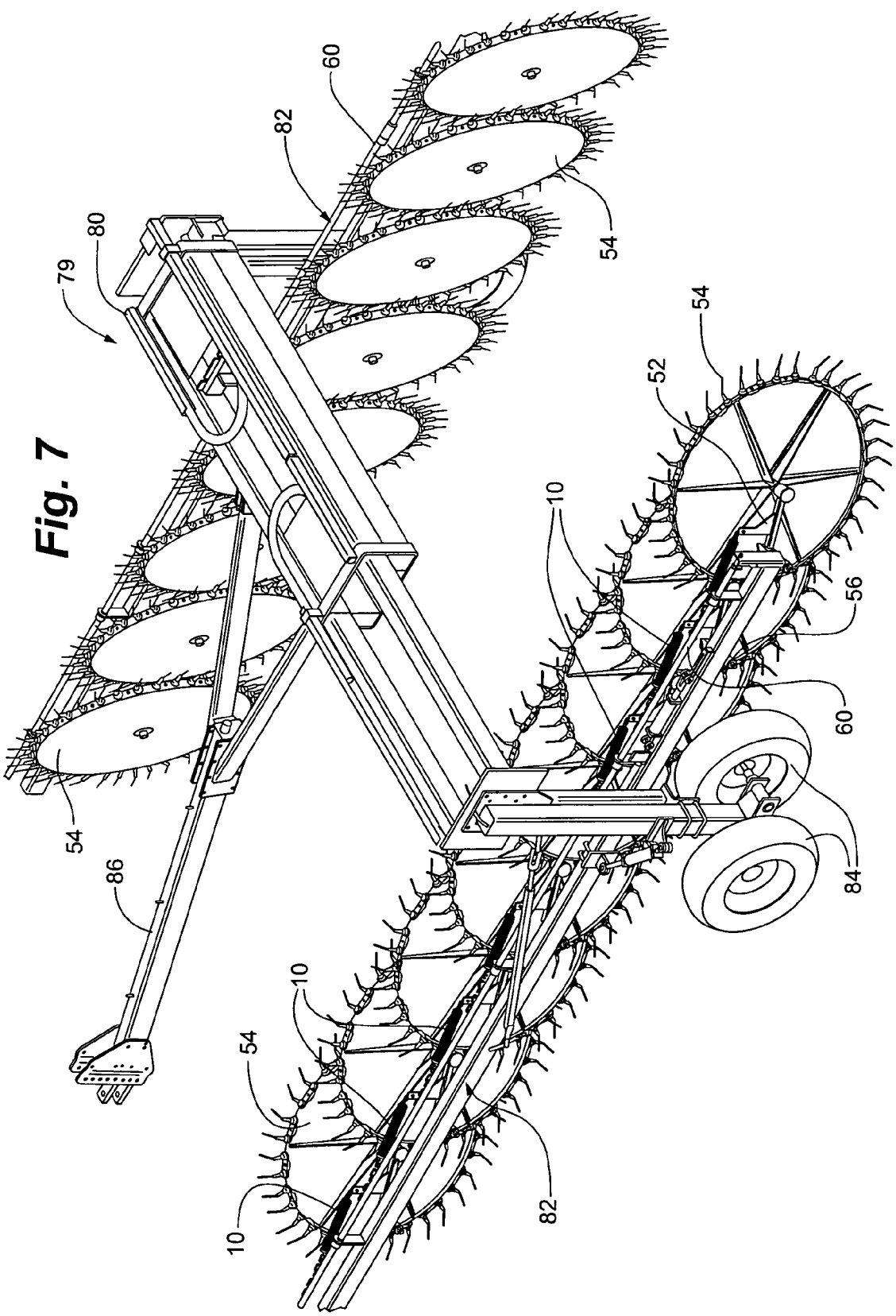
FIG. 7 is a perspective view of a wheel raking including damping springs in accordance with the present invention.

When used, damping spring 10 may be installed on an agricultural implement such as a wheel rake as depicted in FIGS. 7 and 8. A typical wheel rake 79 includes carriage 80 and rake assemblies 82. Rake assemblies 82 are typically mirror images of on another and are supported by carriage 80.

Carriage 80 includes ground engaging wheels 84 and drawbar 86. Drawbar 86 may be attached to a prime mover such as a tractor (not shown) to provide motive force to wheel rake.

Rake assemblies 82 include rake beam 58 supporting bellcranks 52 at pivot 56. Bell cranks 52 support rake wheels 54. Damping spring 10 connects bellcrank 52 to lift tube 60. Typically, long chain 50 connects damping spring 10 to lift tube 60 and short chain 48 connects damping spring 10 to bellcrank 52. Thus, damping spring 10 resiliently supports rake wheel 54 via bellcrank and allows rake wheels 54 to flex upwardly and downwardly as they pass over irregularities of the ground. Thus, the full weight of rake wheels 54 do not bear on the ground since the weight is partially supported by damping spring 10.

When assembled, the ends of coil compression spring 16 rest against shoulder 40 of first spring holder bushing 18 and second spring holder bushing 20. Nuts 28 bear against first spring holder washer 22 and second spring holder washer 24. Thus, loads applied to U-shaped ends 30 of first extended U-bolt 12 and second extended U-bolt 14 are transmitted through first spring holder washer 22 and second spring holder washer 24 to first spring holder bushing 18 and second spring holder bushing 20. First spring holder bushing 18 and second spring holder bushing 20 then apply force to coil compression spring 16. As coil compression spring 16 is compressed, first spring holder bushing 18 and second spring holder bushing 20 are brought closer together.

When first spring holder bushing 18 and second spring holder bushing 20 are close enough together they begin to encounter resilient damping member 26. Thus, resilient damping member 26 is compressed in length and expands in diameter. As resilient damping member 26 expands in diameter it creates an outward force on extended shafts 32 of first extended U-bolt 12 and second extended U-bolt 14. The greater the compression of resilient damping member 26 the greater the force applied against extended shafts 32. As this force is applied, extended shaft may bow outwardly, thus increasing friction against first spring holder bushing and second spring holder bushing 20. This friction also serves to increase damping as force as tension is applied to U-shaped ends of first extended U-bolt 12 and second extended U-bolt 14.

Thus, damping spring 10 does not snap back when tension upon U-shaped ends 30 is released. Damping spring 10 returns to its untensioned length more gradually than an undamped spring. In addition, the greater the compression of coil compression spring 16 the greater the damping force created by the action of resilient damping member 26. Thus, the damping action is proportional to the force exerted by the spring in returning to its uncompressed length.

The present invention may be embodied in other specific forms without departing from the spirit of any of the essential attributes thereof, therefore, the illustrated embodiments should be considered in all respects as illustrative and not restrictive, reference being made to the appended claims rather than to the foregoing description to indicate the scope of the invention.

What is claimed is:

1. A damping spring assembly for use in agricultural implements, the damping spring assembly comprising:
   a spring;
   a first bolt member having a first elongate shaft operably connected to a first end of the spring;
   a second bolt member having a second elongate shaft positioned so that the second elongate shaft is alongside the first elongate shaft and operably connected to a second end of the spring; and
   a resilient damping member positioned substantially between the first and second elongate shafts to deformably, frictionally engage at least one of the first and second elongate shafts as the first and second elongate shafts move in a first direction relative to one another.

2. The damping spring assembly as claimed in claim 1, in which the spring is a coil compression spring.

3. The damping spring assembly as claimed in claim 1, in which the first bolt member is a U-bolt having a first pair of substantially parallel shafts positioned such that the first pair of substantially parallel shafts are positioned at first opposite corners of a square and the second bolt member is a U-bolt having a second pair of substantially parallel shafts positioned such that the second pair of substantially parallel shafts are located at second opposite corners of the square.

4. The damping spring assembly as claimed in claim 1, in which the first bolt member is a U-bolt having a first pair of substantially parallel shafts positioned such that the first pair of substantially parallel shafts are on either side of the second elongate shaft and the resilient damping member is tubular and surrounds the second elongate shaft.

5. The damping spring assembly as claimed in claim 3, in which the resilient damping member comprises a resilient damping rod positioned within a space surrounded by the first pair of substantially parallel shafts and the second pair of substantially parallel shafts.

6. The damping spring assembly as claimed in claim 3, in which the resilient damping member at least partially surrounds at least one of the first or second of the substantially parallel shafts.

7. The damping spring assembly as claimed in claim 1, further comprising a first spring holder bushing operably connected between the first bolt member and the spring and a second spring holder bushing operably connected between the second bolt member and the second end of the spring.

8. The damping spring assembly as claimed in claim 1, in which the resilient damping member comprises a resilient rod.

9. The damping spring assembly as claimed in claim 1, in which the resilient damping member comprises rubber.

10. The damping spring assembly as claimed in claim 3, in which the spring is a coil compression spring and the resilient damping member and the first and second substantially parallel shafts are located inside of the coil compression spring.

11. The damping spring assembly as claimed in claim 3, in which the resilient damping member has a cross sectional shape chosen from a group consisting of circular, square, polygonal, cruciform, annular, H-shaped and circular with apertures therein.

12. A wheel rake comprising:
   a rake beam operably supporting a rake wheel;
   a damping spring assembly operably interconnecting the rake wheel to the rake beam;
   the damping spring assembly comprising:
      a spring;
      a first bolt member having a first elongate shaft operably connected to a first end of the spring;
      a second bolt member having a second elongate shaft positioned so that the second elongate shaft is alongside the first elongate shaft and operably connected to a second end of the spring; and
      a resilient damping member positioned substantially between the first and second elongate shafts to deformably, frictionally engage at least one of the first and second elongate shafts as the as the first and second elongate shafts move in a first direction relative to one another.

13. The wheel rake as claimed in claim 12, further comprising a bell crank operably interposed between the beam and the rake wheel.

14. The wheel rake as claimed in claim 12, in which the spring is a coil compression spring.

15. The wheel rake as claimed in claim 12, in which the first bolt member comprises a first U-bolt positioned such that a first pair of substantially parallel shafts are positioned at first opposite corners of a polygon and the second bolt member comprises a second U-bolt positioned such that a second pair of substantially parallel shafts are located at second opposite corners of the polygon.

16. The wheel rake as claimed in claim 15, in which the resilient damping member comprises a resilient damping rod positioned within a space surrounded by the first pair of substantially parallel shafts and the second pair of substantially parallel shafts.

17. The wheel rake as claimed in claim 15, in which the resilient damping member at least partially surrounds at least one of the first or second of substantially parallel shafts.

18. The wheel rake as claimed in claim 15, further comprising a first spring holder bushing operably connected between the first U-bolt and the spring and a second spring holder bushing operably connected between the second U-bolt and the second end of the spring.

19. The wheel rake as claimed in claim 12, in which the resilient damping member comprises a resilient rod.

20. The wheel rake as claimed in claim 12, in which the resilient damping member comprises rubber.

21. A damping spring assembly for use in agricultural implements, the damping spring assembly comprising:
   a spring;
   a substantially rigid first elongate member operably connected to the spring;
   a resilient damping member positioned adjacent the elongate member,
   the first elongate member shifting along a path of travel adjacent the resilient damping member in a first direction and compressing the resilient damping member as the first elongate member shifts along the path of travel such that the resilient damping member progressively frictionally engages the elongate member as it shifts whereby motion of the elongate member is damped.

22. The damping spring assembly as claimed in claim 21, in which the spring is a coil compression spring.

23. The damping spring assembly as claimed in claim 21, in which the first elongate member comprises a first pair of substantially parallel shafts positioned such that the first pair of substantially parallel shafts are positioned at first opposite corners of a square and further comprising a second elongate member having a second pair of substantially parallel shafts positioned such that the second pair of substantially parallel shafts are located at second opposite corners of the square.

24. The damping spring assembly as claimed in claim 21, in which the first elongate member comprises a first pair of substantially parallel shafts positioned such that the first pair of substantially parallel shafts are on either side of a second elongate member and the resilient damping member is tubular and surrounds the second elongate shaft.

25. The damping spring assembly as claimed in claim 23, in which the resilient damping member comprises a resilient damping rod positioned within a space surrounded by the first pair of substantially parallel shafts and the second pair of substantially parallel shafts.

26. The damping spring assembly as claimed in claim 23, in which the resilient damping member at least partially surrounds at least one of the first or second of the substantially parallel shafts.

27. The damping spring assembly as claimed in claim 21, in which the resilient damping member comprises a resilient rod.

28. The damping spring assembly as claimed in claim 21, in which the resilient damping member comprises rubber.

29. The damping spring assembly as claimed in claim 22, further comprising a second elongate member; and
   in which the first elongate member and the second elongate member are located inside of the coil compression spring.

30. The damping spring assembly as claimed in claim 21, in which the resilient damping member has a cross sectional shape chosen from a group consisting of circular, square, polygonal, cruciform, annular, H-shaped and circular with apertures therein.

31. A damping spring assembly for use in agricultural implements, the damping spring assembly comprising:
   a spring;
   a first U-bolt having a first pair of substantially parallel shafts;
   a second U-bolt having a second pair of substantially parallel shafts positioned so that the second pair of substantially parallel shafts is substantially parallel to the first pair of substantially parallel shafts; and
   a resilient damping member positioned to frictionally engage the first and second pairs of substantially parallel shafts the resilient damping member being positioned to operably interact with the first and second U-bolts such that as the first and second U-bolts travel in a first direction the resilient damping member is compressed axially and expands radially to apply frictional damping to the first and second U-bolts.

32. The damping spring assembly as claimed in claim 31, in which the resilient damping member comprises a resilient damping rod positioned within a space surrounded by the first pair of substantially parallel shafts and the second pair of substantially parallel shafts.

33. The damping spring assembly as claimed in claim 31, in which the resilient damping member at least partially surrounds at least one of the first or second of substantially parallel shafts.

34. The damping spring assembly as claimed in claim 31, in which the spring is a coil compression spring and the resilient damping member and the first and second substantially parallel shafts are located inside of the coil compression spring.

35. The damping spring assembly as claimed in claim 31, in which the resilient damping member has a cross sectional shape chosen from a group consisting of circular, square, polygonal, cruciform, annular, H-shaped and circular with apertures therein.

36. A damping spring assembly for use in agricultural implements, the damping spring assembly comprising:
  means for biasing a first structure relative to a second structure;
  a first means for connecting the means for biasing to the first structure;
  a second means for connecting the means for biasing to the second structure; and
  resilient means for engaging at least one of the first and second means for connecting, the resilient means for engaging being structured such that when the resilient means for engaging is compressed the resilient means for engaging frictionally engages at least one of the means for connecting whereby relative motion of the first and second means for connecting are damped.

37. The damping spring assembly as claimed in claim 36, in which the means for biasing comprises a spring.

38. The damping spring assembly as claimed in claim 36, in which the resilient means for engaging is enclosed within the first and second means for connecting.

39. The damping spring assembly as claimed in claim 36, in which the first means for connecting and the second means for connecting are at least partially enclosed within the resilient means for engaging.

* * * * *